(12) United States Patent
White et al.

(10) Patent No.: US 7,449,514 B2
(45) Date of Patent: *Nov. 11, 2008

(54) STABILIZATION OF FLUORESCENT DYES IN VINYL ARTICLES USING HINDERED AMINE LIGHT STABILIZERS

(75) Inventors: Kenneth M. White, Oakdale, MN (US); Lee A. Pavelka, Cottage Grove, MN (US); Vera L. Lightle, Hudson, WI (US); James C. Coderre, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1505 days.

This patent is subject to a terminal disclaimer.

(21) Appl. No.: 10/304,501

(22) Filed: Nov. 26, 2002

(65) Prior Publication Data

US 2003/0104235 A1    Jun. 5, 2003

Related U.S. Application Data

(63) Continuation of application No. 10/028,162, filed on Dec. 20, 2001, now Pat. No. 6,526,588, which is a continuation of application No. 09/593,335, filed on Jun. 14, 2000, now Pat. No. 6,406,798, which is a continuation of application No. 08/956,332, filed on Oct. 23, 1997, now Pat. No. 6,110,566.

(51) Int. Cl.
*C08K 5/34* (2006.01)
*B32B 15/08* (2006.01)

(52) U.S. Cl. .................. 524/567; 524/102; 428/463; 428/518; 428/520

(58) Field of Classification Search ................. 428/518, 428/520, 406, 323, 325, 122, 463; 524/567, 524/555, 82, 102; 404/93, 99, 95; 264/21, 264/1.9

See application file for complete search history.

(56) References Cited

U.S. PATENT DOCUMENTS

| 3,684,348 A | 8/1972 | Rowland | 350/103 |
| 3,830,682 A | 8/1974 | Rowland | |
| 4,025,159 A | 5/1977 | McGrath | 350/105 |

(Continued)

FOREIGN PATENT DOCUMENTS

EP    0 436 464    7/1991

(Continued)

OTHER PUBLICATIONS

Database WPI, Section Ch, Week 8550, Derwent Publications Ltd., London, GB; Class A14, AN 85-315090; XP002069959; Anonymous: "PVC With Improved Retention of Heat Stability After Weathering—Obtd. By Incorporating a Hindered Amine Light Stabiliser," see abstract & Research Disclosure, vol. 259, No. 001, Emsworth, GB, Nov. 1985.

(Continued)

*Primary Examiner*—Kevin R. Kruer

(57) ABSTRACT

A durable colored article having fluorescent properties comprises a substantially solventless polyvinyl chloride matrix, a thioxanthene fluorescent dye, and a secondary or tertiary hindered amine light stabilizer having a molecular weight less than about 1000 grams/mole. The invention has the advantage in that it provides a flexible polyvinyl chloride film that exhibits durable fluorescent colors.

16 Claims, 2 Drawing Sheets

U.S. PATENT DOCUMENTS

| | | | |
|---|---|---|---|
| 4,238,384 A | 12/1980 | Blumberg et al. | |
| 4,336,092 A | 6/1982 | Wasserman | |
| 4,393,094 A | 7/1983 | Garrett et al. | |
| 4,477,608 A | 10/1984 | Babler et al. | |
| 4,505,967 A | 3/1985 | Bailey | 428/164 |
| 4,720,356 A | 1/1988 | Chu | |
| 4,763,985 A | 8/1988 | Bingham | 350/105 |
| 5,004,770 A | 4/1991 | Cortolano et al. | |
| 5,034,430 A | 7/1991 | Babler | |
| 5,135,568 A | 8/1992 | Fasano | |
| 5,229,882 A | 7/1993 | Rowland | |
| 5,246,991 A | 9/1993 | Igarashi et al. | 524/99 |
| 5,272,562 A | 12/1993 | Coderre | |
| 5,302,497 A | 4/1994 | Berner et al. | |
| 5,316,838 A | 5/1994 | Crandall et al. | 428/283 |
| 5,387,458 A | 2/1995 | Pavelka et al. | 428/141 |
| 5,405,675 A | 4/1995 | Sawka et al. | 428/195 |
| 5,415,911 A | 5/1995 | Zampa et al. | |
| 5,450,235 A | 9/1995 | Smith et al. | 359/529 |
| 5,470,502 A | 11/1995 | Hahn et al. | |
| 5,565,151 A | 10/1996 | Nilsen | |
| 5,605,761 A | 2/1997 | Burns et al. | 428/412 |
| 5,618,626 A | 4/1997 | Nagashima et al. | |
| 5,672,643 A | 9/1997 | Burns et al. | |
| 5,674,622 A | 10/1997 | Burns et al. | |
| 5,844,024 A | 12/1998 | Pitteloud | 524/82 |
| 5,920,429 A | 7/1999 | Burns et al. | |
| 5,989,453 A | 11/1999 | Marcq et al. | |
| 6,110,566 A | 8/2000 | White et al. | 428/172 |
| 6,191,200 B1 | 2/2001 | Phillips | |
| 6,312,132 B1 | 11/2001 | Pavelka et al. | |
| 6,323,266 B2 * | 11/2001 | Phillips | 524/91 |
| 6,395,844 B1 | 5/2002 | Barrera et al. | |
| 6,406,798 B2 | 6/2002 | White et al. | 428/522 |
| 6,472,050 B1 | 10/2002 | Buoni | |
| 6,511,256 B1 | 1/2003 | Flader et al. | |
| 6,514,594 B1 | 2/2003 | Wei et al. | |
| 6,526,588 B2 | 3/2003 | White et al. | |
| 6,531,205 B1 | 3/2003 | Buoni et al. | |
| 6,531,613 B1 | 3/2003 | Olson | |
| 6,533,961 B2 | 3/2003 | Harelstad et al. | |
| 6,537,679 B1 | 3/2003 | Buoni et al. | |
| 6,552,106 B2 | 4/2003 | Phillips | |
| 6,734,235 B2 | 5/2004 | Phillips | |
| 2001/0046607 A1 | 11/2001 | White et al. | |
| 2002/0002929 A1 | 1/2002 | Harelstad et al. | |
| 2002/0090530 A1 | 7/2002 | White et al. | |
| 2002/0106486 A1 | 8/2002 | Nielson et al. | |
| 2002/0132900 A1 | 9/2002 | Barrera et al. | |
| 2003/0203211 A1 | 10/2003 | Wei et al. | |
| 2005/0154098 A1 | 7/2005 | Phillips | |

FOREIGN PATENT DOCUMENTS

| | | |
|---|---|---|
| EP | 0599 208 B1 | 1/1994 |
| EP | 0 612 796 | 8/1994 |
| EP | 0 732 387 A1 | 9/1996 |
| EP | 0 792 907 A2 | 9/1997 |
| JP | 59/56435 | 3/1984 |
| JP | 02-147651 * | 10/1988 |
| JP | 63-255594 | 10/1988 |
| JP | 2-16042 | 1/1990 |
| JP | 02/107671 | 4/1990 |
| JP | 04-174783 | 6/1992 |
| JP | 6-155680 | 6/1994 |
| JP | 06-206286 * | 7/1994 |
| JP | 06/271523 | 9/1994 |
| JP | 08/012893 | 1/1996 |
| JP | 08-319476 | 12/1996 |
| JP | 9-12814 | 1/1997 |
| JP | 09-235418 | 9/1997 |
| WO | WO 94/10588 | 5/1994 |
| WO | WO 95/11464 | 4/1995 |
| WO | WO 96/05247 | 2/1996 |
| WO | WO 96/17012 | 6/1996 |
| WO | WO 97/08756 | 3/1997 |
| WO | WO 97/37252 | 10/1997 |
| WO | WO 99/20688 | 4/1999 |

OTHER PUBLICATIONS

McMurrer, Marcie, "Update: UV Stabilizers," *Plastic Compounding*, Jan./Feb. 1985, pp. 40-57.

Martinez, J. Guillermo et al., "Prediction of Photoageing Stability of Plasticised PVC Films Containing UV-Stabilisers," *Polymer Degradation and Stability*, 54, 1996, pp. 49-55.

Hjertberg, T. et al., "Thermal Degradation of PVC," *Degradation and Stabilisation of PVC*, Elsevier Applied Science Publishers, (1984), pp. 21-79.

Zhang, Can et al., "Hindered Amine Light Stabilizers: Effects of Acid Exposure," *Journal of Polymer Science: Part C: Polymer Letters*, vol. 24, 1986, pp. 453-456.

Notice Declaring Interference No. 105,454, Jun. 2, 2006, 7 pages.

White Miscellaneous Motion 1 (to file Information Disclosure Statement) in Interference No. 105,454, Aug. 4, 2006, 5 pages.

Exhibits 1001 and 1002 in Interference No. 105,454 (Information Disclosure Statement and SB08), Aug. 1, 2006, 2 pages.

Phillips Substantive Motion 1 in Interference No. 105,454, Nov. 29, 2006, 22 pages.

Exhibits 2025 and 2026 in Interference 105,454 (Declaration of Edward Phillips and Plot Comparing Color Stability of Fluorescent PVC Sheeting). Oct. 24, 2006, 9 pages.

Phillips Request for Adverse Judgment in Interference No. 105,454, Dec. 22, 2006, 2 pages.

Decision on Motions in Interference No. 105,454, Apr. 30, 2007, 16 pages.

Judgment in Interference No. 105,454, Apr. 30, 2007, 3 pages.

Capocci, G., "Weatherable Rigid PVC: The Effect of Light and Thermal Stabilizers," *J. of Vinyl Technology*, 11(4): 195-199, 1989.

Cortolano, F.P., "Antioxidants and UV Stabilizers: A Summary of Their Utilization in PVC," *J. of Vinyl Technology*, pp. 69-75, Jun. 1993.

Chevassus, F. et al., "*The Stabilization of Polyvinyl Chloride*," Arnold, pp. 141-145, 1963.

Hawkins, *Polymer Degradation and Stabilization*, Springer, ed. James Harwood, 1984, pp. 3-11 and 68-90.

Ciba Specialty Chemicals Trade Sheet, Ciba Chimassorb 944, Dec. 1975, pp. 1-2.

Ciba Specialty Chemicals Trade Sheet, Ciba Tinuvin 123, Jul. 28, 1999, pp. 1-3.

Ciba Specialty Chemicals Trade Sheet, Ciba Tinuvin 783, Nov. 1999, pp. 1-2.

Chiba Specialty Chemicals Trade Sheet, Ciba Tinuvin 791, Nov. 1999, pp. 1-2.

Pasch, Harald, German Institute for Polymeric Materials, "Instrumental Analysis of Polyolefins," lecture at UNESCO School on Macromolecules & Materials Science, Stellenbosch, South Africa, Arp. 7-8, 2001, pp. 1-39.

"Clariant introduces new antioxidant," Oct. 1, 2002, http://222.specialchem4polymers.com/resources/latest/displaynews.aspx?id=895&or=s10 9741_102_895&q=hostavin++.

Notice Declaring Interference No. 105,454, Jun. 2, 2006, 7 pages.

White Miscellaneous Motion 1 (to file Information Disclosure Statement) in Interference No. 105,454, Aug. 4, 2006, 5 pages.

Exhibits 1001 and 1002 in Interference No. 105,454 (Information Disclosure Statement and SB08), Aug. 1, 2006, 2 pages.

Phillips Substantive Motion 1 in Interference No. 105,454, Nov. 29, 2006, 22 pages.

Exhibits 2025 and 2026 in Interference 105,454 (Declaration of Edward Phillips and Plot Comparing Color Stability of Fluorescent PVC Sheeting), Oct. 24, 2006, 9 pages.

Phillips Request for Adverse Judgment in Interference No. 105,454, Dec. 22, 2006, 2 pages.

Decision on Motions in Interference No. 105,454, Apr. 30, 2007, 16 pages.
Judgment in Interference No. 105,454, Apr. 30, 2007, 3 pages.
Capocci, G., "Weatherable Rigid PVC: The Effect of Light and Thermal Stabilizers," *J. of Vinyl Technology*, 11(4): 195-199, 1989.
Cortolano, F.P., "Antioxidants and UV Stabilizers: A Summary of Their Utilization in PVC," *J. of Vinyl Technology*, pp. 69-75, Jun. 1993.
Chevassus, F. et al., "*The Stabilization of Polyvinyl Chloride*," Arnold, pp. 141-145, 1963.
Hawkins, *Polymer Degradation and Stabilization*, Springer, ed. James Harwood, 1984, pp. 3-11 and 68-90.
Ciba Specialty Chemicals Trade Sheet, Ciba Chimassorb 944, Dec. 1975, pp. 1-2.
Ciba Specialty Chemicals Trade Sheet, Ciba Tinuvin 123, Jul. 28, 1999, pp. 1-3.
Ciba Specialty Chemicals Trade Sheet, Ciba Tinuvin 783, Nov. 1999, pp.1-2.
Ciba Specialty Chemicals Trade Sheet, Ciba Tinuvin 791, Nov. 1999, pp. 1-2.
Pasch, Harald, German Institute for Polymeric Materials, "Instrumental Analysis of Polyolefins," lecture at UNESCO School on Macromolecules & Materials Science, Stellenbosch, South Africa, Apr. 7-8, 2001, pp. 1-39.
"Clariant introduces new antioxidant," Oct. 1, 2002, http://222.specialchem4polymers.com/resources/latest/displaynews.aspx?id=895&or=s109741_102_895&q=hostavin++.

\* cited by examiner

STABILIZATION OF FLUORESCENT DYES IN VINYL ARTICLES USING HINDERED AMINE LIGHT STABILIZERS

RELATED APPLICATIONS

This application is a continuation application of patent application Ser. No. 10/028,162 filed Dec. 20, 2001, now U.S. Pat. No. 6,526,588 which is a continuation of patent application Ser. No. 09/593,335 filed Jun. 14, 2000, issued Jun. 18, 2002 as U.S. Pat. No. 6,406,798; which is a continuation of patent application Ser. No. 08/956,332 filed Oct. 23, 1997, issued Aug. 29, 2000 as U.S. Pat. No. 6,110,566.

TECHNICAL FIELD

The present invention pertains to polyvinyl chloride articles that exhibit durable fluorescent colors through the use of selected hindered amine light stabilizers.

BACKGROUND

Articles containing colorants lose their color when exposed to solar radiation for extended time periods. For example, articles placed outdoors throughout the summer often tend to display a faded version of their original color by the time autumn arrives. Although this fading occurs in both conventional and fluorescent colorants, the problem is more acute with fluorescent colorants.

The life of fluorescent colored articles is typically in the range of months when exposed to daily solar radiation, whereas the life of articles that use conventional colorants can be in the range of years. Although generally less stable, fluorescent colorants nonetheless find frequent use because of their ability to increase an article's visibility. Unlike conventional colorants, fluorescent colorants can take light that they absorb and reemit it in the visible spectrum. This innate property allows fluorescent articles to exhibit an enhanced visual contrast between the colored article and its surrounding environment.

Investigators in the retroreflective art have attempted to stabilize polymeric articles containing fluorescent colorants using various means. For example, Burns et al. in U.S. Pat. No. 5,605,761 teach the use of a hindered amine light stabilizer (HALS) to maintain the durability of articles containing fluorescent dyes in a polycarbonate polymeric matrix. The document further discloses that the fluorescent dye may be thioxanthene, perylene imide, or thioindigoid dyes, and the HALS may be compounds from the 2,2,6,6-tetraalkyl piperidine class of compounds. While these articles are extremely useful in maintaining fluorescent color stability, they are not very flexible due to the polycarbonate matrix's inherent rigidity.

Others, such as Pavelka et al. in U.S. Pat. No. 5,387,458 have attempted to maintain fluorescent colors by using an ultraviolet screening layer that screens out ultraviolet (UV) radiation in the range of 340 to 400 nanometers. The document also discloses that the fluorescent color resides in a separate layer rather than in the screening layer. Although these articles are highly beneficial because of their stable fluorescent colors, they do present the need of having two separate layers that can add cost to the construction. Furthermore, the screening layer may not be effective in reducing the degradation of the fluorescent dye caused by dye absorbtion of visible radiation.

Polyvinyl chloride (PVC) films are useful in many applications because of their flexibility and commercial availability. UV absorbing stabilizers have been commonly used in polyvinyl chloride articles to light stabilize the polymer matrix. See, e.g., Marice McMurrer, *Update: UV Stabilizers*, PLASTICS COMPOUNDING 40 (January/February 1985). UV stabilizers, however, are not effective in stabilizing fluorescent dyes in the matrix.

Although PVC films containing fluorescent dyes are widely available today, they tend to have very poor color retention. Factors contributing to the color fading include lack of dye solubility in the PVC host matrix, dye migration, and minimal protection offered by the resin against photodegradation.

Technical publications have suggested that HALS, with its amine group in the molecular structure, may not be compatible with PVC. For example, T. Hjertberg and E. M. Sörvik stated in *Thermal Degradation of PVC*, in DEGRADATION AND STABILISATION OF PVC, E. D. Owen (editor) 21, 69 (1984) that amines "induce dehydrochlorination of PVC at high temperatures" leading to degradation of the PVC matrix. In addition, HALS based on secondary or tertiary piperidinyl amines are very basic compounds. For example, 2,2,6,6-tertamethyl piperidine has a $pk_b$ of 2.9 as compared to 4.7 for ammonia when measured in water. See Can Zhang et al., *Hindered Amine Light Stabilizers: Effects of Acid Exposure*, Volume 24 of JOURNAL OF POLYMER SCIENCE: PART C: POLYMER LETTERS 453, 453 (1986). Because of its alkalinity, HALS in the presence of a volatile acid, such as hydrochloric acid (HCl), forms a salt. Hydrochloric acid is produced by degradation and oxidation reactions resulting from "light induced aging of PVC films." See Martinez et al., *Prediction of Photoageing Stability of Plasticized PVC Films Containing UV-Stabilisers*, Volume 54 of POLYMER DEGRADATION AND STABILITY 49, 49 (1996). The presence of a basic HALS in combination with a readily available source of HCl gives rise to acid-base reactions that can degrade the PVC matrix.

Because of the flexible nature of PVC films and the desirability using of fluorescent colorants in many articles, there is a need for a durable colored article having these combinations.

SUMMARY OF THE INVENTION

The present invention provides, for the first time, colored articles exhibiting durable fluorescent properties in a solventless PVC host matrix by incorporating a particular class of HALS to stabilize a class of fluorescent dyes. Contrary to known teachings that HALS may not be compatible with PVC, this invention includes the discovery that new combinations of HALS and fluorescent dyes in a PVC host matrix will exhibit superior stabilization of colored, fluorescent articles. Because the PVC host matrix has good mechanical and thermal properties, the inventive article will be useful in many applications, including, but not limited to, uses in clothing, traffic control signs and devices (for example, roll-up signs), backpacks, and water flotation safety devices.

In brief summary, the inventive article exhibits durable color and fluorescent properties and comprises (a) a polymeric matrix that contains substantially solventless polyvinyl chloride resin; (b) a thioxanthene fluorescent dye; and (c) a hindered amine light stabilizer comprising at least one secondary or tertiary amine groups and having a molecular weight of less than about 1000 grams/mole. The inventive articles can be made by combining these components into a mixture and forming an article from the mixture.

Because processing of a substantially solventless polyvinylchloride resin subjects the resin to high temperatures, it was not predicted that a durable fluorescent-colored article would result. As indicated above, amines can induce dehydrochlorination of the polyvinyl chloride at high temperatures, which can lead to degradation of the polyvinyl chloride matrix. Notwithstanding this concept, the inventive article is surprisingly durable. Thus, the combination of using substantially solventless polyvinyl chloride and HALS provides benefits unsuggested in the art for forming durable fluorescent-colored, PVC articles.

The present invention has the advantage in that it exhibits durable color properties and fluorescence without the need to use protective overlays. If desired, however, a protective overlay may be used to further increase the durability of the inventive article. The inventive articles retain their color and are able to fluoresce for a longer time period than is normally expected even when they are exposed to direct sunlight. Articles of the invention therefore are good candidates for use with retroreflective elements.

Another advantage of the invention is that the polymers, dyes, and HALS may be processed in a solventless system, which not only essentially eliminates solvent emissions into the atmosphere but also reduces the article's manufacturing cost by totally eliminating solvent use.

BRIEF DESCRIPTION OF THE DRAWINGS

The invention will be further explained with reference to the drawings, wherein.

These figures are idealized, are not to scale, and are intended to be merely illustrative and non-limiting.

DEFINITIONS

As used herein:

"colorant" means pigments or dyes or other substances used to impart hue and chroma to an article;

"conventional colorant" means colorants that do not significantly fluoresce when exposed to visible light and/or ultraviolet light and do not exhibit fluorescent properties to the unaided eye;

"cube film" means a single retroreflective film having cube corner elements projecting from one surface thereof;

"cube corner sheeting" means a multilayer retroreflective sheeting that contains cube corner elements;

"durable" refers to an enhanced retention of color or fluorescence upon exposure to weathering;

"embedded lens" retroreflective base sheet comprises (a) a monolayer of microspheres having a space layer and (b) a reflective layer in optical association with the rear surface of the microspheres and a binder layer in which the front surfaces of the microspheres are embedded;

"encapsulated lens" retroreflective base sheet comprises (a) a monolayer of microspheres having a reflective layer in association with the rear surface of the microspheres and (b) a cover layer disposed over the front surface of the microspheres forming cells;

"exposed lens" retroreflective base sheet comprises a monolayer of microspheres having a reflective layer in association with the rear surface of microspheres that are embedded in a binder layer;

"hindered amine light stabilizer" means an additive used to light stabilize fluorescent dyes, the stabilizer having at least one secondary or tertiary amine group;

"polymeric matrix" means the principal polymeric material in which the fluorescent dye and hindered amine light stabilizer reside;

"secondary amine group" means a group that contains nitrogen (N) and has one hydrogen (H) atom bonded to the nitrogen atom;

"tertiary amine group" means a group that contains nitrogen (N) and does not have a hydrogen (H) atom bonded to the nitrogen atom;

"substantially solventless polyvinyl chloride resin" means a polymeric polyvinyl chloride resin capable of being processed, whether through extrusion or calendering, without the use of a solvent;

"thioxanthene fluorescent dye" means a fluorescent dye having a thioxanthene unit as part of its molecular structure;

"weathering" means exposing an article to either natural or artificial environments including, for example, heat, light, moisture, and ultraviolet radiation.

DETAILED DESCRIPTION OF THE ILLUSTRATIVE EMBODIMENTS

The present invention combines a substantially solventless polyvinyl chloride host matrix with fluorescent dyes, and hindered amine light stabilizers to yield durable, colored fluorescent articles.

Figure 1:
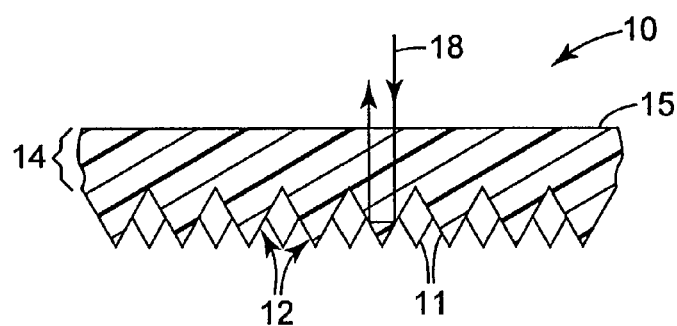
FIG. 1 is a cross-sectional view of a retroreflective article 10 in accordance with the invention.

FIG. 1 shows a cube corner based retroreflective article 10 of the invention. Article 10 (commonly referred to as "cube film") comprises a multitude of cube corner elements 12 and a land layer 14. Not shown in the figure are fluorescent dyes and hindered amine light stabilizers. Light enters the cube film 10 through the front or first major surface 15. The light then passes through the land layer 14 and strikes the planar faces 11 of the cube corner elements 12 and returns in the direction from which it came as shown by arrow 18.

Figure 2:
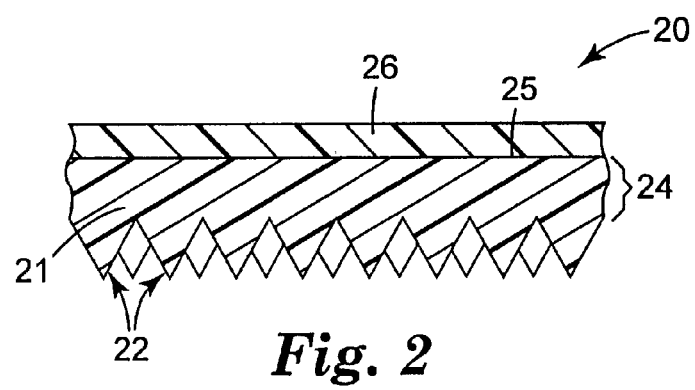
FIG. 2 is a cross-sectional view of another embodiment of retroreflective article 20 in accordance with the invention.

FIG. 2 shows a cube corner based retroreflective article 20 of the invention. Article 20 comprises a body layer 26 disposed on a front or first major surface 25 of a cube film 21. The cube film 21 comprises a multitude of cube corner elements 22 and can optionally include a land layer 24. In a preferred embodiment, the body layer 26 comprises a substantially solventless polyvinyl chloride matrix, fluorescent dyes, and hindered amine light stabilizers (all not shown) and is the outermost layer of article 20. The land layer 24 is distinguished from the body layer 26 by being a layer disposed immediately adjacent to the base of the cube corner elements. If desired, the land layer 24, if present, and/or the cube corner elements 22 can comprise a substantially solventless polyvinyl chloride matrix, fluorescent dyes and hindered amine light stabilizers.

Figure 3:
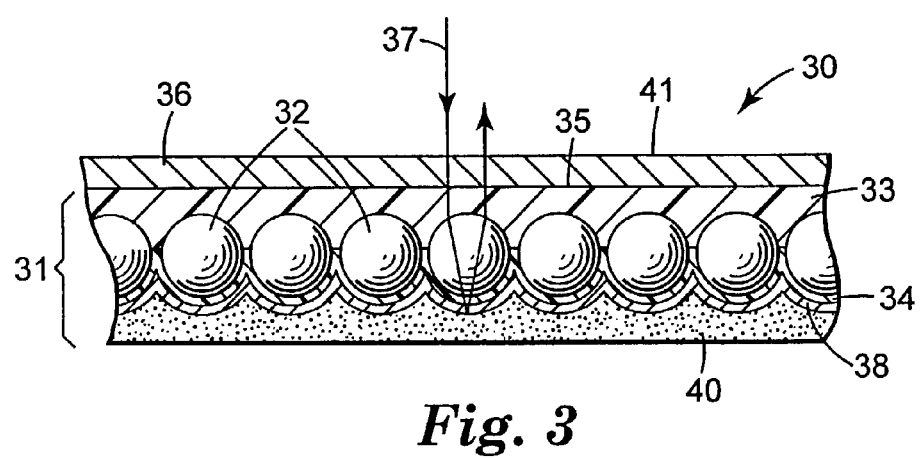
FIG. 3 is a cross-sectional view of another embodiment of retroreflective article 30 in accordance with the invention.

FIG. 3 shows a microsphere based retroreflective article 30 of the invention. Article 30 comprises a body layer 36 disposed on the front or first major surface 35 of an embedded lens retroreflective base sheet 31. For an illustrative example of an embedded lens sheet, see U.S. Pat. No. 4,505,967 (Bailey). Base sheet 31 comprises a monolayer of microspheres 32 embedded in a binder layer 33 with space layer 34, specular reflective layer 38 and optional adhesive layer 40. Light enters retroreflective article 30 through its front surface 41. The light then passes through the body layer 36 and the binder layer 33, strikes microspheres 32, passes through space layer 34 to strike the specular reflective layer 38, and returns in the direction from which it came as shown by arrow 37.

The retroreflective base sheet can also be exposed lens or encapsulated lens—see U.S. Pat. No. 5,316,838 (Crandall) and U.S. Pat. No. 4,025,159 (McGrath) respectively for examples of such sheeting. In a preferred embodiment, the body layer 36 comprises a substantially solventless polyvinyl chloride matrix, fluorescent dyes, and hindered amine light stabilizers.

Figure 4:
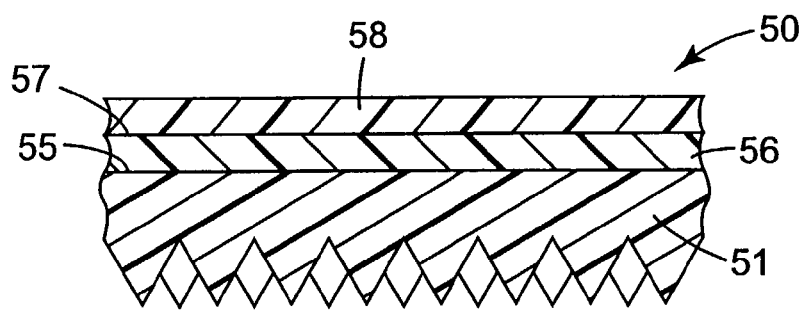
FIG. 4 is a cross-sectional view of another embodiment of retroreflective article 50 in accordance with the invention.

Although not necessary, articles of the invention may optionally include a protective overlay that may or may not include ultraviolet absorbing agents. The overlay is preferably substantially transparent to visible light and includes a means to screen substantial portions of incident ultraviolet radiation. FIG. 4 illustrates a retroreflective embodiment 50 having a cube film 51. Body layer 56 is disposed on the front or first major surface 55 of cube film 51. Disposed on a first side 57 of body layer 56 is an overlay 58. In a preferred embodiment, body layer 56 comprises a substantially solventless polyvinyl chloride matrix, fluorescent dyes, and hindered amine light stabilizers. Overlay 58 is preferably coextensive with body layer 56 so as to provide the most protection.

The polymeric matrix used in the present invention contains substantially solventless polyvinyl chloride as the host matrix. The polymeric matrix does not need to possess other polymers (e.g., acrylic polymers) to impart good durability and thus may consist essentially of solventless polyvinyl chloride. Plasticizers may be incorporated into the matrix to impart desirable physical properties, such as flexibility. Illustrative examples of useful plasticizers include di-2-ethyl-hexyl phthalate, commercially available as DOP from Aristech Chemical Corp., and diisononyl phthalate, commercially available as JAYFLEX DINP, from Exxon Corp. UV absorbers such as hydroxybenzophenones can be added to stabilize the PVC from ultraviolet light degradation. Other additives that may be added as processing aids include fillers, heat stabilizers, and lubricants.

Plasticized PVC is advantageous in that it has excellent flexibility so as to be conformable to a variety of diverse substrates ranging from fabrics to substrates with compound curves, such as a traffic barrel. Articles of the invention have sufficient flexibility to be wound at room temperature about a mandrel, having a diameter of 3 millimeter without cracking. Plasticized PVC can also be attached easily to a substrate, through adhesive means or mechanical means. An illustrative mechanical means involves sewing the inventive product onto a fabric substrate.

The substantially solventless PVC films may be made by extruding or calendering PVC resins combined with fluorescent dyes and HALS into a film or cube film having a nominal thickness of about 0.025 millimeters (mm) (0.001 inch) to about 3.2 mm (0.125 inch), preferably about 0.076 mm (0.003 inch) to about 0.5 mm (0.02 inch). The latter range is preferable in that it is more useful for retroreflective sheetings. Film thickness may vary with the particular application. For example, if the application requires high durability, typically a thicker film, on the order of about 0.75 mm (0.030 inch) may be more useful. The thickness of the PVC film or cube film has an affect on the quantity of fluorescent dyes and hindered amine light stabilizers that can be loaded into the film.

The fluorescent dyes useful for this invention are dyes from the thioxanthene classes of compounds. A single dye or a combination of dyes may be used. Illustrative commercially available thioxanthene fluorescent dyes useful in the present invention include HOSTASOL® RED GG, HOSTASOL® YELLOW 3G, DAY-GLO® D-304, and DAY-GLO® D-315.

A useful fluorescent orange dye is 14H-anthra[2,1,9-mna]thioxanthene-14-one, commercially available as C.I. Solvent Orange 63 (HOSTASOL® RED GG) from Hoescht Celanese, and having the following chemical structure:

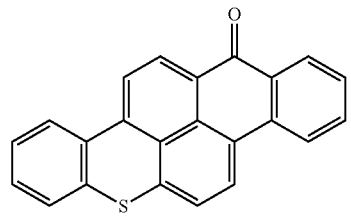

A useful yellow fluorescent dye is N-octadecyl-benzo[k,l]thioxanthene-3,4-dicarboximide, commercially available as C.I. Solvent Yellow 98 (HOSTASOL® YELLOW 3G) from Hoescht Celanese, and having the following chemical structure:

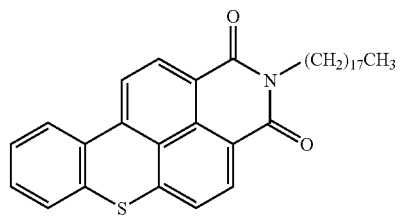

Another useful yellow fluorescent dye is DAY-GLO® D-304, which is a thioxanthene compound, available from Day-Glo Color Corp., Cleveland, Ohio. Another useful orange fluorescent dye is DAY-GLO® D-315, also a thioxanthene compound available from Day-Glo Color Corp.

Typically, up to 2 weight percent and preferably about 0.01 weight percent to about 1.0 weight percent of the dye is present in the inventive film. The weight percent is based on the total weight of the inventive film. Dye loadings outside this range may be used in accordance with the invention to achieve the desired color. For example, if the dye is added to a thicker film, a lower dye loading can give the same visual effect. Articles having higher dye loadings generally exhibit brighter fluorescence and deeper color than articles with lower dye loadings of the same dye. Articles having a high dye loading, however, may exhibit a self-quenching phenomenon that occurs when molecules of the dye absorb the energy emitted by neighboring dye molecules. This self-quenching can cause an undesirable decrease in fluorescent brightness.

Articles that possess excess dye can become opaque—perhaps because some of the excess dye may have not dissolved into the polymeric matrix. For applications that require the inventive articles to be light transmissive, such as applications requiring retroreflection, persons skilled in the art should take care to select an appropriate dye loading so that substantially all of the dye dissolves into the polymeric matrix. For applications that do not require light transmissivity, such as decorative applications, the dye loading may not be as important because opacity is not a problem.

Other dyes and pigments (whether fluorescent or non-fluorescent) may be added to the present invention to adjust the color and appearance of the article. Care should be taken, however, to select dyes and pigments, as well as their loadings, so as not to significantly interfere with the performance of the fluorescent dyes in the article. If retroreflective elements are included in the inventive article, the dyes or pigments should not undesirably impair the article's transparency. If the inventive article has reduced transparency, its retroreflective performance may also be undesirably reduced.

As discussed, numerous technical articles have indicated that a hindered amine light stabilizer (HALS), with its amine group, is not compatible with polyvinyl chlorides. Thus the use of certain HALS to light stabilize the inventive fluorescent colored PVC articles is very surprising.

Without intending to be bound by theory, it is believed that the combination of selected HALS, the substantially solventless polyvinyl chloride host matrix, and selected fluorescent dyes in the present invention prevents an as yet undefined degradation and/or reaction between the dye and the polyvinyl chloride which could otherwise occur. Insofar as we know, the advantages of the present invention are attained through the combination of the substantially solventless polyvinyl chloride matrix, the thioxanthene fluorescent dye, and the hindered amine light stabilizers described herein.

Typically, up to about 2 weight percent, and preferably about 0.05 to about 1.0 weight percent of the HALS is contained in the inventive article. The weight percent of HALS used is based on the total weight of the inventive film.

Illustrative commercially available HALS useful in the present invention include TINUVIN® 770, TINUVIN® 144, and SANDUVOR® PR-31.

A HALS, having the chemical formula of Bis-(2,2,6,6-tetramethyl-4-piperidinyl) sebacate and a molecular weight of about 480 grams/mole, contains secondary amines, is commercially available as TINUVIN® 770 from Ciba-Geigy Corp., and has the following chemical structure:

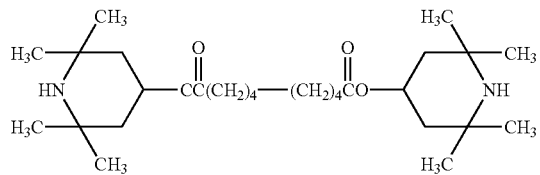

This HALS possesses two secondary amine groups, where the nitrogen atom is bonded to two carbon atoms and a hydrogen atom.

A HALS, having the chemical formula of Bis-(1,2,2,6,6-pentamethyl-4-piperidinyl)-2-n-butyl-2-(3,5-di-tert-butyl-4-hydroxybenzyl)malonate and a molecular weight of about 685 grams/mole, contains tertiary amines, is commercially available as TINUVIN® 144 from Ciba-Geigy Corp., and has the following chemical structure:

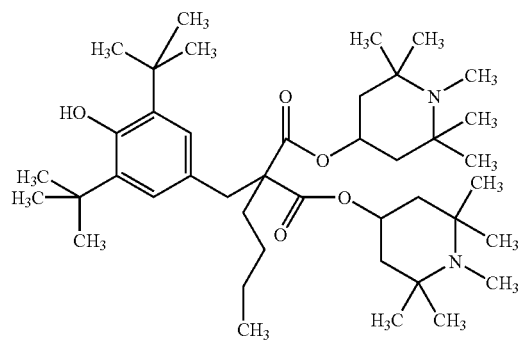

A HALS, having a chemical formula of propanedioic acid, [(4-methoxyphenyl)-methylene]-bis-(1,2,2,6,6-pentamethyl-4-piperidinyl)ester, and a molecular weight of about 529 grams/mole, contains tertiary amines, is commercially available as SANDUVOR® PR-31 from Clariant Corp., and has the following chemical structure:

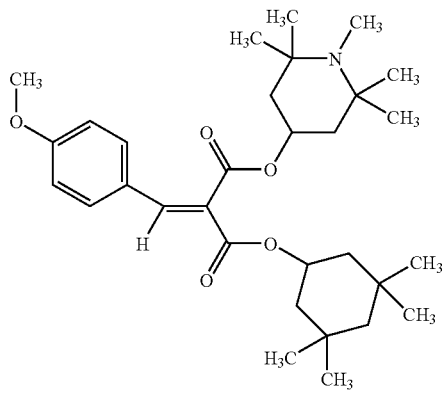

TINUVIN® 144 and SANDUVOR® PR-31 each possesses two tertiary amine groups, where the nitrogen atom is bonded to three carbon atoms.

Method of Making

The inventive film can be made using an extrusion or a calendering method. Although both methods are useful in producing a substantially flat film, they do so by different processes. Extrusion involves processing a viscous melt under pressure to force it through a shaping die in a continuous stream to form a film. Calendering takes a mass of fused, viscous material and feeds it between successive pairs of co-rotating, parallel rolls to form a film. Extrusion has the advantage in that if a cube film is desired, the feed stock leaving the extruder can be nipped directly into a mold having cube corner recesses. Calendering, on the other hand, has the advantage in that flexible PVC films can be economically produced using this process.

A method of making an article exhibiting durable color and fluorescent properties can comprise: (a) combining substantially solventless polyvinyl chloride resin, a thioxanthene fluorescent dye, and a hindered amine light stabilizer comprising at least one secondary or tertiary amine groups having a molecular weight less than 1000 grams/mole into a mixture; and (b) forming the article from the mixture.

Typically, in an extrusion process the polymeric resin/dye/HALS mixture is first tumble mixed together. The polymeric resin is typically in the form of small granules. The mixture is fed into an extruder where, with the presence of heat and rotational action of the screw, the mixture is mixed and changes into a viscous melt. Typically, an extruder with multiple zones of heating is used. The extrusion temperature should be chosen to melt the components but not be so high so as to degrade them. Suitable extrusion temperatures, when using the fluorescent dyes and HALS described above, range from about 175° C. to about 205° C. Typically, the melt leaving the extrusion dye is allowed to contact a chrome roll or polished casting roll to form a substantially flat film.

If desired, the melt leaving the extrusion die is allowed to contact a mold or tool having cube corner recesses therein. When the melt is nipped into the mold, a cube corner film is formed having, preferably, a minimal land layer and a multitude of cube corner elements whose base plane is adjacent to the land layer. See, for example, U.S. Pat. No. 5,450,235 (Smith et al.) and International Publication No. WO 95/11464 (Benson et al.) for descriptions of methods of producing a cube corner sheeting. Extrusion is the preferred method for making an inventive cube film.

The cube corner elements may optionally be vapor coated with a metallic layer, such as vapor deposited aluminum or silver, to increase retroreflective performance. Vapor coating the cube corner elements, however, may cause the fluorescent cube film to have a gray appearance, which may be undesirable for some applications.

In a calendering process, the polyvinyl chloride resin (typically in powder form), the fluorescent dye, and the hindered amine light stabilizer are added to mixing unit for intensive mixing. Other additives, such as plasticizers, UV absorbers, heat stabilizers, fillers, and lubricants may be added for desired physical properties and/or as processing aids. Typically the mixing unit has a ribbon type blade and can be jacketed for heating and cooling. During mixing, the PVC powder absorbs the additives, including the dye and HALS, to form a powder mix. After intensive mixing, the powder is typically cooled and fed through a screen to remove metals because the metal particles, if present, can damage the calender roll surface. The screened powder mixture is typically fed into a fluxing unit for continuous mixing causing the mixture to become a fused, viscous mass that is feed stock to be delivered to the calender rolls. The calender rolls, typically in a four roll setup, can be heated. In making the inventive article, the calender rolls are heated so that their surface temperature ranges from about 170° C. to about 180° C. (340 to 355° F.). Configuration of the rolls can also be an important factor. The viscous, fused feedstock is fed to the calender where the film or sheet is formed with the film thickness controlled by the gap between the final rolls.

Although this sequence is typical for a calendering process, many variations are possible depending on the end product desired. Calendering is a preferred method for making the inventive film because of economic efficiencies.

Given what is known in the art about amines inducing dehydrochlorination of PVC at high temperatures, the invention nonetheless discovered that PVC articles produced from calendering or extrusion with temperatures as high as 205° (355° F.) are durable, as shown herein by the examples.

Substantially flat films, whether produced by extrusion or calendering, can be laminated to a preexisting retroreflective base sheet, such as cube corner based or microsphere based sheets. Typically, the film is laminated to the front or first major surface of retroreflective base sheets to produce a new retroreflective article in accordance with the present invention. For example, as shown in FIG. 2, the body layer 26, typically a substantially flat film, is laminated to a front or first major surface 25 of cube film 21 to produce a retroreflective article 20 of the invention. Similarly, in FIG. 3, the body layer 36, typically a substantially flat film, is laminated to a front or first major surface 35 of microsphere based retroreflective base sheet 31 to produce a retroreflective article 30 of the invention.

Figure 5:
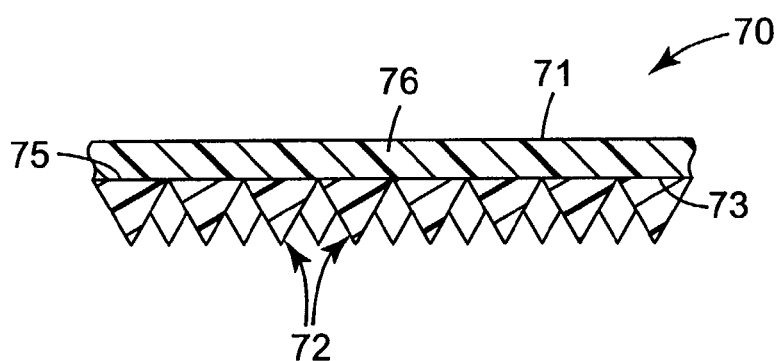
FIG. 5 is a cross-sectional view of another embodiment of retroreflective article 70 in accordance with the invention.

In a preferred embodiment, the inventive films are used as a carrier for radiation cured cube corner elements. These cube corner elements comprise reactive resins capable of being crosslinked by a free radical polymerization mechanism by exposure to actinic radiation, for example, electron beam, ultraviolet light, or visible light. See U.S. Pat. No. 5,450,235 (Smith et al.) and International Publication No. WO 95/11464 for examples of such reactive resins. The reactive resin is preferably cured in situ on the inventive film. FIG. 5 shows a cube corner based retroreflective article 70 of the invention manufactured in accordance with the principles of the invention disclosed in International Publication No. WO 95/11464 published Apr. 27, 1995, entitled "Ultra-Flexible Retroreflective Cube Corner Composite Sheetings and Methods of Manufacture." The embodiment in FIG. 5 is designed to be a highly flexible retroreflective sheeting suitable for conforming to corrugated and/or flexible surfaces.

As shown in FIG. 5, retroreflective article 70 comprises a multitude of substantially independent cube corner elements 72 and a body layer 76 having two major surfaces 71 and 73, the cube corner elements projecting from the first major surface 73 and have zero to minimal land. Thus, this embodiment has essentially no land layer and the front surface 75 of the cube corner elements is juxtaposed against surface 73. In a preferred embodiment, body layer 76 comprises substantially solventless polyvinyl chloride matrix, fluorescent dyes and hindered amine light stabilizers (all not shown) and is the outermost layer of article 70.

EXAMPLES

The following examples are provided to illustrate different embodiments and details of the invention. Although the examples serve this purpose, the particular ingredients and amounts used as well as other conditions and details are not to be construed in a manner that would unduly limit the scope of this invention. Unless otherwise specified, all percentages are in weight percent.

Accelerated Weathering

To simulate outdoor exposure to sunlight on an accelerated basis, some samples were exposed to accelerated weathering in accordance with a cycle defined by ASTM G-26 Type B, Method A. The light source was a 6500-watt, water-cooled xenon arc device that has borosilicate inner and outer filters. The light source exhibits an irradiance of about 0.55 watts/meter$^2$. The weathering cycle consisted of 102 minutes of light at a Black Panel temperature (as defined in the test method) of about 63° C., followed by 18 minutes of exposure while subjecting the sample to deionized water spray.

Ultraviolet-Visible (US-Vis) Absorption Spectroscopy

The amount of fluorescent dye retained in a sample was determined by measuring the major dye absorption band (456 nanometers (nm)) using UV-Vis spectroscopy before and after the sample was subjected to weathering. An illustrative UV-Vis spectrophotometer used was a Shimadzu model UV2101-PC.

Following Beer's Law, a decrease in absorbance is related to a reduction in dye concentration. A "percent dye retention" value was calculated as the ratio of the peak absorbance in the weathered sample to the peak absorbance of the original unweathered sample.

The following abbreviations are used in the examples:

| Abbreviations | Meaning |
|---|---|
| PVC | Polyvinyl chloride host matrix |
| T-770 | Hindered amine light stabilizer TINUVIN ® 770 Bis-(2,2,6,6-tetramethyl-4-piperidinyl) sebacate Molecular weight of about 480 grams/mole Available from Ciba-Geigy Corp., Hawthorne, NY. |
| T-144 | Hindered amine light stabilizer TINUVIN ® 144 Bis-(1,2,2,6,6-pentamethyl-4-piperidinyl)-2-n-butyl-2-(3,5-di-tert-butyl-4-hydroxybenzyl)malonate Molecular weight of about 685 grams/mole Available from Ciba-Geigy Corp. |

-continued

| Abbreviations | Meaning |
|---|---|
| PR-31 | Hindered amine light stabilizer<br>Propanedioic acid, [(4-methoxyphenyl)-methylene]-<br>bis-(1,2,2,6,6-pentamethyl-4-piperidinyl)ester<br>Molecular weight of about 529 grams/mole<br>Available from Clariant Corp., Charlotte, NC. |
| T-622 | Hindered amine light stabilizer TINUVIN ® 622<br>Dimethyl succinate polymer with 4-hydroxy-<br>2,2,6,6-tetramethyl-1-piperidine ethanol<br>Molecular weight ($M_n$) approximately greater than<br>2,500 grams/mole<br>Available from Ciba-Geigy Corp. |
| C-944 | Hindered amine light stabilizer CHIMASORB ® 944FL<br>Poly [6-[(1,1,3,3-tetramethylbutyl)amino]-s-triazine-2,4-<br>diyl][2,2,6,6-tetramethyl-4-piperidyl)imino]<br>hexamethylene[(2,2,6,6-tetramehtyl-4-piperidyl)imino)]<br>Molecular weight ($M_n$) approximately greater<br>than 2,500 grams/mole<br>Available from Ciba-Geigy Corp. |
| T-440 | Hindered amine light stabilizer TINUVIN ® 440<br>Low molecular weight acetylated hindered amine<br>Molecular weight of about 435 grams/mole<br>Available from Ciba-Geigy Corp. |
| C-3346 | Hindered amine light stabilizer CYASORB ® 3346<br>Oligomeric hindered amine<br>Molecular weight ($M_n$) approximately<br>greater than 1,600 grams/mole<br>Available from American Cyanamid Corp. |
| SO63 | Thioxanthene orange fluorescent dye<br>HOSTASOL ® RED GG;<br>14H-anthra[2,1,9-mna]thioxanthene-14-one;<br>Available from Hoechst Celanese, Charlotte, NC. |
| SY98 | Thioxanthene yellow fluorescent dye<br>HOSTASOL ® YELLOW 3G<br>N-Octadecyl-benzo[k,1]thioxanthene-3,4-dicarboximide<br>Available from Hoechst Celanese. |
| D-304 | Thioxanthene yellow fluorescent dye DAY-GLO ® 304<br>Available from Day-Glo Color Corp., Cleveland, OH. |
| D-315 | Thioxanthene orange fluorescent dye DAY-GLO ® 315<br>Available from Day-Glo Color Corp. |
| D-838 | Coumarin fluorescent POTOMAC<br>YELLOW ™ D-838 dye<br>Available from Day-Glo Color Corp. |
| RED FB | Anthrapyridone fluorescent red dye FLUORESCENT<br>RED FB ™<br>Available from Keystone Aniline Corp., Chicago, IL. |
| RED 5B | Thioindigoid fluorescent red dye<br>HOSTASOL ® RED 5B<br>C.I. (color index) Vat Red 41<br>Available from Hoechst Celanese. |

Example 1

A polyvinyl chloride film having a thickness of about 0.089 mm (0.0035 inch) to about 0.11 mm (0.0045 inch) was made as follows. PVC resin (formulation S00354 containing UV absorbers from Alpha Chemical and Plastics Corp.) was mixed with about 0.2% SO63 fluorescent dye and about 0.5% of the T-770 HALS. The resin/dye/HALS mixture was tumbled mixed. It was then extruded into a substantially flat film using a single screw extruder with 5 heating zones set at about 175, 205, 205, 175 and 175° C. and the film die set at about 180° C. The extruder was a three-quarters (¾) inch single screw Brabender extruder with polished chrome rolls.

The sample was subjected to 100 hours of weathering, and the data are reported in Tables 1 and 2.

Examples 2 and 3, and Comparative Examples A to E are all made according to Example 1 with different HALS used or no HALS used as described in Table 1. The samples were subjected to 100 hours of accelerated weathering, and the data are reported in Table 1.

TABLE 1

EXTRUDED PVC FILMS CONTAINING
SO63 FLUORESCENT DYE WITH VARIOUS HALS

| Example No. | HALS | Percent Dye Retention After 100 hours weathering |
|---|---|---|
| 1 | T-770 | 55 |
| 2 | T-144 | 66 |
| 3 | PR-31 | 61 |
| Comparative A | T-622 | 9 |
| Comparative B | C-944 | 14 |
| Comparative C | T-440 | 11 |
| Comparative D | C-3346 | 15 |
| Comparative E | None | 7 |

As can be seen from the results of TABLE 1, a sample without any HALS (Comparative E) performed worst in that nearly all of the dye was depleted from the film. HALS that had a molecular weight exceeding 1000 grams/mole (Comparative A, B and D) did poorly in the stabilization of the fluorescent dye. Comparative C, having a molecular weight of 435 grams/mole, did not perform well because it did not contain at least one secondary or tertiary amine group.

Examples 4 to 6 were made according to Example 1 except that different fluorescent dyes were used as shown in Table 2. Unless otherwise specified, the samples were subjected to 100 hours of accelerated weathering, and the data are reported in Table 2.

Comparative Examples E to N were made according to Example 1 but different fluorescent dyes were used with and without HALS as shown in Table 2. Unless otherwise specified, the samples were subjected to 100 hours of accelerated weathering, and the data are reported in Table 2.

TABLE 2

EXTRUDED PVC FILMS CONTAINING
VARIOUS FLUORESCENT DYES WITH AND WITHOUT HALS

| Example No. | Fluorescent Dye | HALS Used | Percent Dye Retention |
|---|---|---|---|
| 1 | SO63 | T-770 | 55 |
| 4[a] | SY98 | T-770 | 56 |
| 5 | D-304 | T-770 | 53 |
| 6[a] | D-315 | T-770 | 39 |
| Comparative E | SO63 | None | 7 |
| Comparative F[a] | SY98 | None | 37 |
| Comparative G | D-304 | None | 35 |
| Comparative H[a] | D-315 | None | 17 |
| Comparative I | D-838 | T-770 | 9 |
| Comparative J | RED FB | T-770 | 13 |
| Comparative K[b] | RED 5B | T-770 | 5 |
| Comparative L | D-838 | None | 18 |
| Comparative M | RED FB | None | 25 |
| Comparative N[b] | RED 5B | None | 3 |

[a]Sample was subjected to 200 hours of accelerated weathering.
[b]Sample was subjected to 50 hours of accelerated weathering.

As shown in Table 2, samples of the invention containing thioxanthene fluorescent dyes with T-770 HALS (Examples 1, 4, 5 and 6) outperformed those samples that did not contain thioxanthene fluorescent dyes stabilized with the same T-770 HALS (Comparatives I, J and K). Those samples that did contain thioxanthene fluorescent dyes but no HALS (Comparatives E, F, G and H) did not retain the dye as well as those that did contain HALS (Examples 1, 4, 5 and 6). Finally, comparing Comparatives I, J and K with Comparatives L, M and N shows that non-thioxanthene fluorescent dye samples do not retain their color even if HALS was used. Thus, in this situation, use of HALS, even if it is the preferred HALS, was ineffective.

Example 7

A polyvinyl chloride film was made using a pilot scale calendering process as follows. A powder of PVC was mixed with about 0.2% SY98 fluorescent dye and about 0.5% T-770 HALS. Other additives, for example UV absorbers, heat stabilizers, plasticizers, lubricants, and fillers were added either for processing aid or to help make a flexible PVC film. The mixture was fed through a strainer to remove metal, if present. The mixture was continuously mixed to form a fused mass, milled, and fed through rolls, all heated at about 177° C. (350° F.), to form the inventive film about 0.13 mm to about 0.15 mm (0.005 to 0.006 inch) thick. The sample was subjected to 400 hours of accelerated weathering and the data are reported in Table 3 below.

Comparative O

A calendered PVC film was made according to Example 7 except that no HALS was added to the PVC powder. The sample was subjected to 400 hours of accelerated weathering, and the data are reported in Table 3.

TABLE 3

CALENDERED PVC FILMS CONTAINING SY98 FLUORESCENT DYE

| Example No. | HALS | Fluorescent Dye | Percent Dye Retention (After 400 hours) |
|---|---|---|---|
| 7 | T-770 | SY98 | 76 |
| Comparative O | None | SY98 | 1.3 |

As shown in Table 3, calendered PVC film of the invention containing a fluorescent dye and a HALS clearly outperformed a sample that did not contain a HALS.

Example 4 and its comparative counterpart, Comparative E, were both exposed to 400 hours of accelerated weathering, and the data are reported in Table 4.

TABLE 4

EXTRUDED PVC FILMS CONTAINING SY98 FLUORESCENT DYE

| Example No. | HALS | Fluorescent Dye | Percent Dye Retention (After 400 hours) |
|---|---|---|---|
| 4 | T-770 | SY98 | 29 |
| Comparative E | None | SY98 | 9 |

As shown in Table 4, extruded PVC film of the invention containing a fluorescent dye and a HALS outperformed a sample that did not contain a HALS.

All references cited herein are incorporated by reference in each reference's entirety.

What is claimed is:

1. An extended life fluorescent polyvinyl chloride sheeting comprising:
   a) a polyvinyl chloride film having a fluorescent colorant and hindered amine light stabilizer incorporated therein; and
   b) a protective polymer layer, which is attached to said polyvinyl chloride film.

2. The sheeting of claim 1 wherein said fluorescent colorant includes a xanthene-based fluorescent dye.

3. The sheeting of claim 1 wherein said fluorescent colorant includes a dye selected from thioxanthenes.

4. The sheeting of claim 1 wherein said hindered amine includes bis-(2,2,6,6-tetramethyl-4-piperidinyl) sebacate.

5. The sheeting of claim 1 wherein the polyvinyl chloride film includes a metalized layer thereon.

6. The sheeting of claim 5 wherein the metalized layer is formed of a metal selected from the group consisting of aluminum and silver.

7. The sheeting of claim 1, wherein said protective polymer layer includes an ultraviolet absorber.

8. An extended life fluorescent polyvinyl chloride sheeting, comprising:
   (a) a polyvinyl chloride film having a fluorescent colorant and hindered amine light stabilizer incorporated therein; and
   (b) a protective polymer layer, which is disposed over and adjacent to said polyvinyl chloride film.

9. The sheeting of claim 8, wherein said fluorescent colorant includes a xanthene-based fluorescent dye.

10. The sheeting of claim 8, wherein said fluorescent colorant includes a dye selected from thioxanthenes.

11. The sheeting of claim 8, wherein said hindered amine includes bis-(2,2,6,6-tetramethyl-4-piperidinyl) sebacate.

12. The sheeting of claim 8, wherein the polyvinyl chloride film includes a metalized layer thereon.

13. The sheeting of claim 12, wherein the metalized layer is formed of metal selected from the group consisting of aluminum and silver.

14. The sheeting of claim 8, wherein said protective polymer layer includes an ultraviolet absorber.

15. A retroreflective structure formed with the fluorescent polyvinyl chloride sheeting of claim 1 or claim 8.

16. A retroreflective structure formed with the fluorescent polyvinyl chloride sheeting of claim 7 or 14.

* * * * *

UNITED STATES PATENT AND TRADEMARK OFFICE
CERTIFICATE OF CORRECTION

PATENT NO. : 7,449,514 B2  Page 1 of 1
APPLICATION NO. : 10/304501
DATED : November 11, 2008
INVENTOR(S) : Kenneth M. White It is certified that error appears in the above-identified patent and that said Letters Patent is hereby corrected as shown below:

Column 8

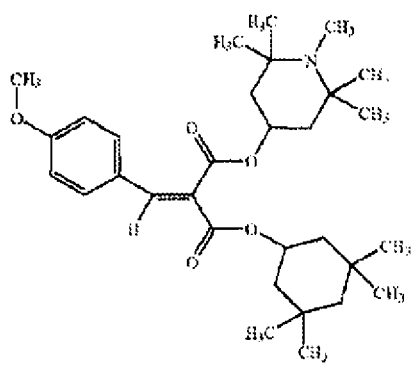

Lines 10-20 (approx.), Delete " " and insert

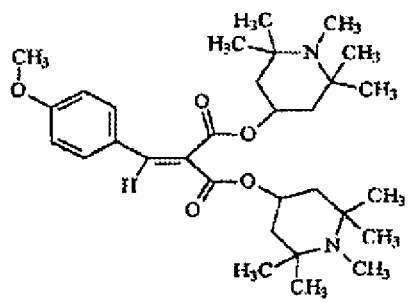

-- --, therefor.

Signed and Sealed this

Twelfth Day of May, 2009

JOHN DOLL
*Acting Director of the United States Patent and Trademark Office*